US012743700B1

(12) United States Patent
Smith et al.

(10) Patent No.: US 12,743,700 B1
(45) Date of Patent: Sep. 22, 2026

(54) BLOCKCHAIN-BASED FRAUD PREVENTION

(71) Applicant: Gemini IP, LLC, New York, NY (US)

(72) Inventors: Rich Smith, Barrington, RI (US); Nicholas Hamilton Steele, Brooklyn, NY (US); Baron von Oldenburg, Shoreline, WA (US)

(73) Assignee: Gemini IP, LLC, New York, NY (US)

( * ) Notice: Subject to any disclaimer, the term of this patent is extended or adjusted under 35 U.S.C. 154(b) by 0 days.

(21) Appl. No.: 19/357,476

(22) Filed: Oct. 14, 2025

Related U.S. Application Data

(63) Continuation of application No. 17/737,617, filed on May 5, 2022, now abandoned.

(51) Int. Cl.
*G06Q 20/40* (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS 6,516,056 B1 2/2003 Justice et al.
10,853,812 B2 12/2020 Kuchar et al.
11,170,376 B2 11/2021 Kavali
11,568,415 B2 1/2023 Bravick et al.
12,056,708 B2 * 8/2024 Kim .......................... H04L 9/50
2015/0220914 A1 * 8/2015 Purves ................. G06Q 20/405 705/41
2017/0011389 A1 * 1/2017 McCandless .......... G06Q 20/36
2021/0374739 A1 * 12/2021 Tai ..................... G06Q 20/3674
2022/0101326 A1 3/2022 Kim et al.
2023/0214845 A1 * 7/2023 Cheong .................. G06N 3/045 705/44
2023/0289806 A1 * 9/2023 Agrawal ........... G06Q 20/4016
(Continued)

FOREIGN PATENT DOCUMENTS

WO WO-2024151263 A1 * 7/2024 ........... G06Q 20/065
WO WO-2024184426 A1 * 9/2024 ............. G06Q 50/18

OTHER PUBLICATIONS

Bui-Huu et al.: Blockchain Powered e-Wallet: Enhancing Security and Fraud Detection in Online Payments, 2024, pp. 1-6. (Year: 2024).*

(Continued)

*Primary Examiner* — Bijendra K Shrestha
(74) *Attorney, Agent, or Firm* — Lee & Hayes, P.C.

(57) ABSTRACT

Disclosed are various embodiments for blockchain-based fraud prevention. A smart contract can receive a request to add a wallet address to a table or list of compromised wallet addresses of a blockchain network. The smart contract can then verify that the request is signed by an authorized wallet address. In response to a verification that the request is signed by the authorized wallet address, the smart contract can add the wallet address to the table or list of compromised wallet addresses. Later, the smart contract can receive a status request that includes the wallet address. In response to receipt of the status request, the smart contract can return a Boolean value that indicates that the wallet address is included in the table or list of compromised wallet addresses.

21 Claims, 4 Drawing Sheets

(56) References Cited

U.S. PATENT DOCUMENTS

2024/0104524 A1* 3/2024 Holisky, Jr. ............... H04L 9/50
2025/0165959 A1* 5/2025 Park ..................... G06Q 20/065

OTHER PUBLICATIONS

Bui-Huu et al.: Blockchain Powered e-Wallet: Enhancing Security and Fraud Detection in Online Payments, 2024, pp. 1-6. (Year: 2024) (Year: 2024).*
Office Action for U.S. Appl. No. 17/737,617, mailed on Jan. 14, 2025, Smith, "Blockchain-Based Fraud Prevention", 9 pages.
Office Action for U.S. Appl. No. 17/737,617, dated May 1, 2025, 10 pages.
Office Action for U.S. Appl. No. 17/737,617, mailed on Sep. 8, 2023, Smith, "Blockchain-Based Fraud Prevention", 25 pages.
Office Action for U.S. Appl. No. 17/737,617, Dated Sep. 12, 2024, Smith, "Blockchain-Based Fraud Prevention", 10 pages.
Office Action for U.S. Appl. No. 17/737,617.

* cited by examiner

BLOCKCHAIN-BASED FRAUD PREVENTION

RELATED APPLICATIONS

This Application is a continuation of and claims priority to U.S. patent application Ser. No. 17/737,617, filed May 5, 2022, which incorporated by reference herein in its entirety and for all purposes.

BACKGROUND

Cryptocurrency wallets and wallet addresses on blockchains are pseudonymous. The owner of the wallet or wallet address is often unknown or anonymous until the wallet or wallet address is linked to an individual's identity (e.g., as the result of exchanging cryptocurrency for fiat currency on an exchange or as the result of making a purchase for goods that are shipped to an individual). Because of this pseudononymity, it can be difficult to determine whether a wallet or wallet address is associated with illicit, illegal, or fraudulent transactions (e.g., because the wallet or wallet address is in the possession of stolen or fraudulently obtained cryptocurrency coins or tokens).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for preventing fraud using a blockchain. A smart contract deployed to a blockchain can be used to store information about wallet addresses that have been compromised or otherwise used in illicit or illegal activities. For example, if a cryptocurrency marketplace has reason to believe that one or more addresses have been used to receive stolen cryptocurrency, or are being used to launder cryptocurrency, then the cryptocurrency marketplace could add the addresses to the list of wallet addresses maintained by the smart contract.

A third-party, prior to interacting with a wallet address, could query the smart contract to see if the wallet address of the counterparty is listed as a compromised or otherwise untrusted or untrustworthy wallet address. If the smart contract returns an indication that the wallet address is stored in the list of wallet addresses that it maintains, then the third-party would know that the wallet address has previously been reported as compromised or previously been associated with illegal or illicit activity. The third-party could then choose not to send cryptocurrency coins or tokens to or receive cryptocurrency coins or tokens from the wallet address. Alternatively, the third-party could factor the presence of the wallet address in the list in its risk evaluation as it decides whether to send cryptocurrency coins or tokens to or receive cryptocurrency coins or tokens from the wallet address.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
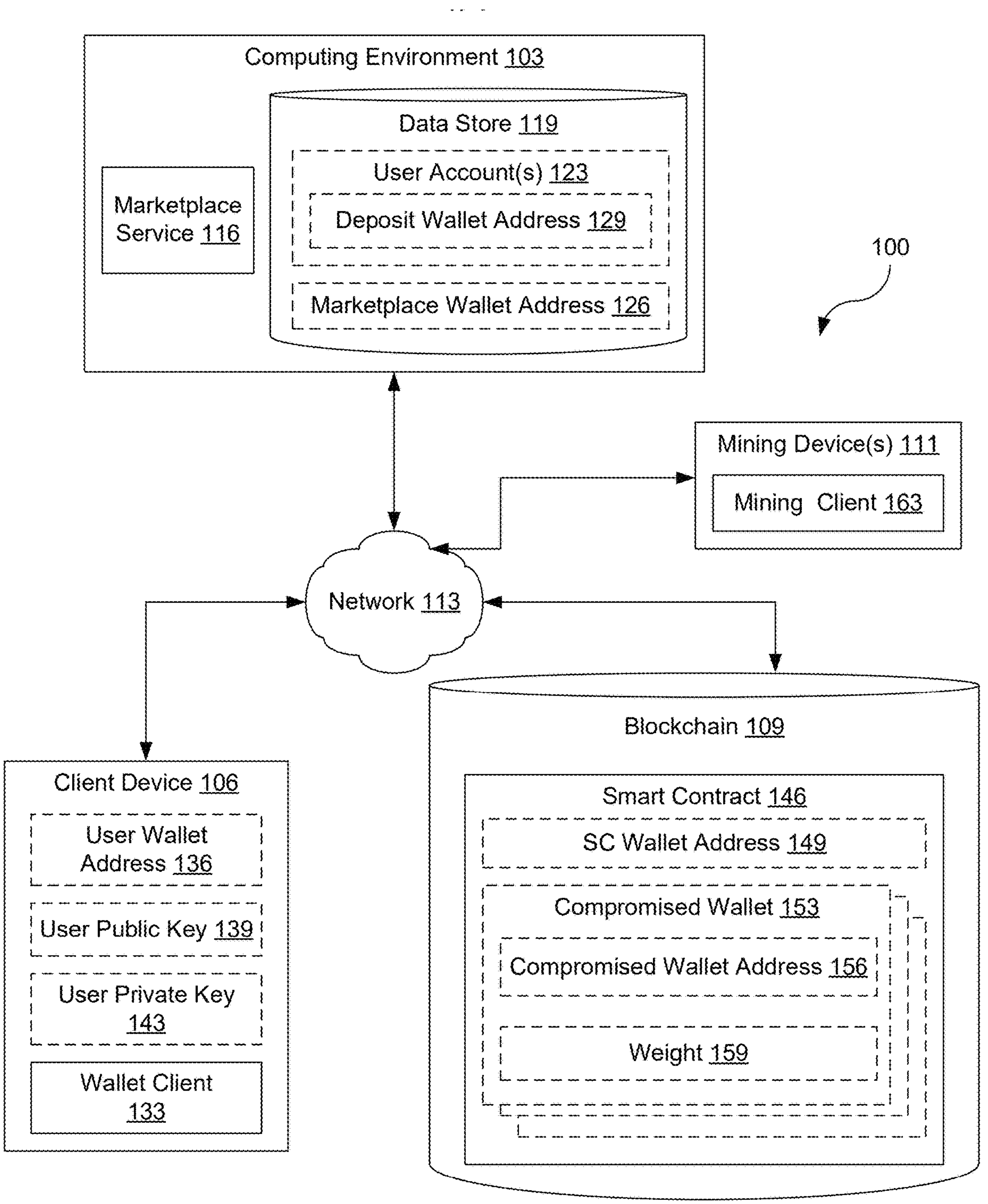
FIG. 1 is a drawing of a network environment according to various embodiments of the present disclosure.

With reference to FIG. 1, shown is a network environment 100 according to various embodiments. The network environment 100 can include a computing environment 103, one or more client devices 106, a blockchain 109, and one or more mining devices 111, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include the marketplace service 116, and other applications, services, processes, systems, engines, or functionality not discussed in detail herein.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 119 is associated with the operation of the various applications or functional entities described below. This data can include user accounts 123, a marketplace wallet address 126, and potentially other data.

Individual user accounts 123 can represent user specific information for individual users of the marketplace service 116. Accordingly, each user account can be associated with one or more deposit wallet addresses 129, which can allow users to receive or deposit cryptocurrency coins or tokens with the marketplace service 116. Individual user accounts 123 can have one or more deposit wallet addresses 129 (e.g., one for each blockchain 109 supported by the marketplace service 116). The marketplace wallet address 126 can represent the address of the wallet used by the marketplace service 116 for longer-term storage of cryptocurrency coins or tokens, such as those deposited or received by users using their respective deposit account address(es) 129.

The marketplace service 116 can be executed to provide a marketplace where users can buy, sell, or trade cryptocurrency coins or tokens, including non-fungible tokens (NFTs). Accordingly, the marketplace service 116 can also provide mechanisms to allow a user to transfer cryptocurrency coins or tokens to the custody of the marketplace service for short-term, medium-term, or long-term storage. Accordingly, the marketplace service 116 could provide users with individual deposit wallet addresses 129 which users could use to deposit funds with the marketplace service 116. Once received, funds could be transferred to the marketplace wallet address 126 of the marketplace service 116.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a wallet client 133 or other applications. Various data used by the wallet client 133 can also be stored on the client device 106, which can include a user wallet address 136, a user public key 139, and a user private key 143.

The wallet client 133 can be executed to allow the client device 106 to interact with the nodes of the blockchain 109. The wallet client 133 can be executed to send cryptocurrency coins or tokens from the user wallet address 136 to a specified wallet address, to view the amount of cryptocurrency coins or tokens that the blockchain 109 has recorded as being associated with the user wallet address 136, or to sign transactions associated with the user wallet address 136 using the user private key 143. Examples of wallet clients 133 include METAMASK, EXODUS Wallet, etc.

The user wallet address 136 can represent an address on the blockchain 109 that a user has demonstrated ownership or control of. In contrast to a deposit wallet address 129 that is provided by a marketplace service 116 to a user, the user wallet address 136 is under the control and custody of an individual user.

The user public key 139 can represent the public key of a public-private key pair associated with the user wallet address 136. In many implementations, the user wallet address 136 is derived from the user public key 139.

The user private key 143 can represent the private key of a public-private key pair associated with the user wallet address 136. The user private key 143 can be used to sign or authorize transactions involving the user wallet address 136, such as when a user sends cryptocurrency coins or tokens from his or her user wallet address 136 to a destination wallet address using the wallet client 133 installed on his or her client device 106.

The blockchain 109 can represent an immutable, append only, eventually consistent distributed data store formed from a plurality of nodes in a peer-to-peer network that maintain duplicate copies of data stored in the blockchain 109. The nodes of the blockchain 109 can use a variety of consensus protocols to coordinate the writing of data written to the blockchain 109. In order to store data to the blockchain 109, such as a record of a transaction of cryptocurrency coins or tokens between wallet addresses, users can pay cryptocurrency coins or tokens to one or more of the nodes of the blockchain 109. Examples of blockchains 109 include the BITCOIN network, the ETHEREUM network, the SOLANA network, etc.

In some implementations, smart contracts 146 can be stored on the blockchain 109. A smart contract 146 can represent executable computer code that can be executed by a node of the blockchain 109. In many implementations, the smart contract 146 can expose one or more functions that can be called by any user or by a limited set of users. To execute one or more functions of a smart contract 146, an application can submit a request to a node of the blockchain 109 to execute the function. The node can then execute the function and store the result to the blockchain 109. Nodes may charge fees in the form of cryptocurrency coins or tokens to execute a function and store the output, with more complicated or extensive functions requiring larger fees. An example of this implementation is the ETHEREUM blockchain, where users can pay fees, referred to as "gas," in order to have a node of the ETHEREUM blockchain execute the function and store the result to the ETHEREUM blockchain. Additionally, the more "gas" a user pays, the more quickly the function will be executed and its results committed to the blockchain 109.

Various data can be stored by or associated with the smart contract 146. This can include a smart contract wallet address 149 and one or more compromised wallets 153. The compromised wallets 153 can be stored in various data structures, such as a table of compromised wallets 153, a list of compromised wallets 153, an array of compromised wallets 153, etc.

The smart contract wallet address 149 represents a unique identifier that uniquely identifies the smart contract 146 with respect to other smart contracts or user wallets on the blockchain 109.

Each compromised wallet 153 represents a wallet on the blockchain 109 that has been reported to the smart contract 146 as having been compromised, associated with illegal or illicit activity, or otherwise having reputational issues. Accordingly, a compromised wallet 153 can represent a wallet that a counterparty to a transaction may not wish to send cryptocurrency to or receive cryptocurrency from due to legal, regulatory, or reputational risks. Therefore, each record of a compromised wallet 153 could include the compromised wallet address 156, a weight 159, and potentially other information.

The compromised wallet address 156 can represent the address on the blockchain 109 of the compromised wallet 153. In some implementations, a weight 159 can be assigned to the compromised wallet 153, which can reflect the degree to which a compromised wallet 153 can be trusted. For example, a compromised wallet 153 that exclusively contains stolen cryptocurrency coins or tokens could have a weight of "1," while a compromised wallet 153 where only half of the cryptocurrency coins or tokens are stolen could have a weight of "0.5."

Although depicted separately within the network environment 100 for clarity, the mining devices 111 represent nodes of the blockchain 109 that host or execute a mining client 163. Examples of a mining device 111 can include general purpose personal computers that execute the mining client 163 or dedicated computing devices that contain application specific integrated circuits (ASICs) that implement the mining client 163 in hardware. The mining client 163 can be representative of any application that can be executed to receive requests to validate transactions and create new blocks for the blockchain 109 that include the validated transactions.

Next, a general description of the operation of the various components of the network environment 100 is provided. Although this general description provides one example of the interactions between the various components of the network environment 100 of FIG. 1, other interactions or sequences of interactions are also covered by the various embodiments of the present disclosure. Additional details about specific operations and/or interactions are provided in the description accompanying FIGS. 2-4.

To begin, a compromised wallet 153 is reported to the smart contract 146. The report could come from a variety of sources, such as a marketplace service 116, an individual user, a vetted third-party (e.g., security research, law enforcement, etc.). In order to ensure that the smart contracts 146 records are not polluted, the functions that would be called by individuals to add a compromised wallet 153 to the smart contract 146 could be limited or restricted to individuals that control a predefined signing key or key(s), which could be used to sign the submission.

Subsequently, third parties can send queries to the smart contract 146 to confirm whether a specified wallet address is associated with a known compromised wallet 153. For example, a marketplace service 116 might submit a query to the smart contract 146 prior to sending cryptocurrency coins or tokens to a destination wallet to make sure that a transfer on behalf of a user account 123 is legitimate. As another example, a marketplace service 116 could submit a query to the smart contract 146 when funds are received by a deposit wallet address 129 in order to determine whether the cryptocurrency coins or tokens received by the deposit wallet address 129 are from a reputable or legitimate source. Similarly, individual users could use their wallet clients 133 to submit queries to the smart contract 146 to ensure that counterparties to a transaction are reputable.

Moreover, the smart contract 146 can also track the flow of cryptocurrency coins or tokens from compromised wallets 153 to other wallets. Recipient wallets can then be flagged by the smart contract 146 as compromised wallets 153. As discussed later, the smart contract 146 can track the flow of cryptocurrency coins or tokens from one wallet to another through a variety of mechanisms. In some implementations, a transaction could be reported to the smart contract 146 each time cryptocurrency coins or tokens are sent to, or received from, a wallet. For example, regulatory or legal frameworks could require marketplace services 116 to report to the smart contract 146 each cryptocurrency coin or transaction to which the marketplace services 116 are a party. As another example, an off-blockchain oracle or similar data source (e.g., a blockchain explorer or analyzer service) could regularly report cryptocurrency coins or transactions to the smart contract 146.

Moreover, the smart contract 146 can calculate and assign weights 159 to wallets that have been flagged as compromised wallets 153. This would allow for users or marketplace services 116 to evaluate the degree of risk involved in proceeding with a transaction. For example, a wallet address with a very low weight 159 would probably be safe to interact with, as the low weight 159 would indicate that it had received at some point only an incidental amount of illegitimate, illegal, or fraudulent cryptocurrency coins or tokens, perhaps unknowingly as part of a legitimate transaction. In contrast, a wallet address with a very high weight 159 is indicative of a wallet that is frequently used for laundering cryptocurrency coins or tokens or is otherwise heavily involved in transactions that include illegitimate, illegal, or fraudulently sourced cryptocurrency coins or tokens.

Figure 2:
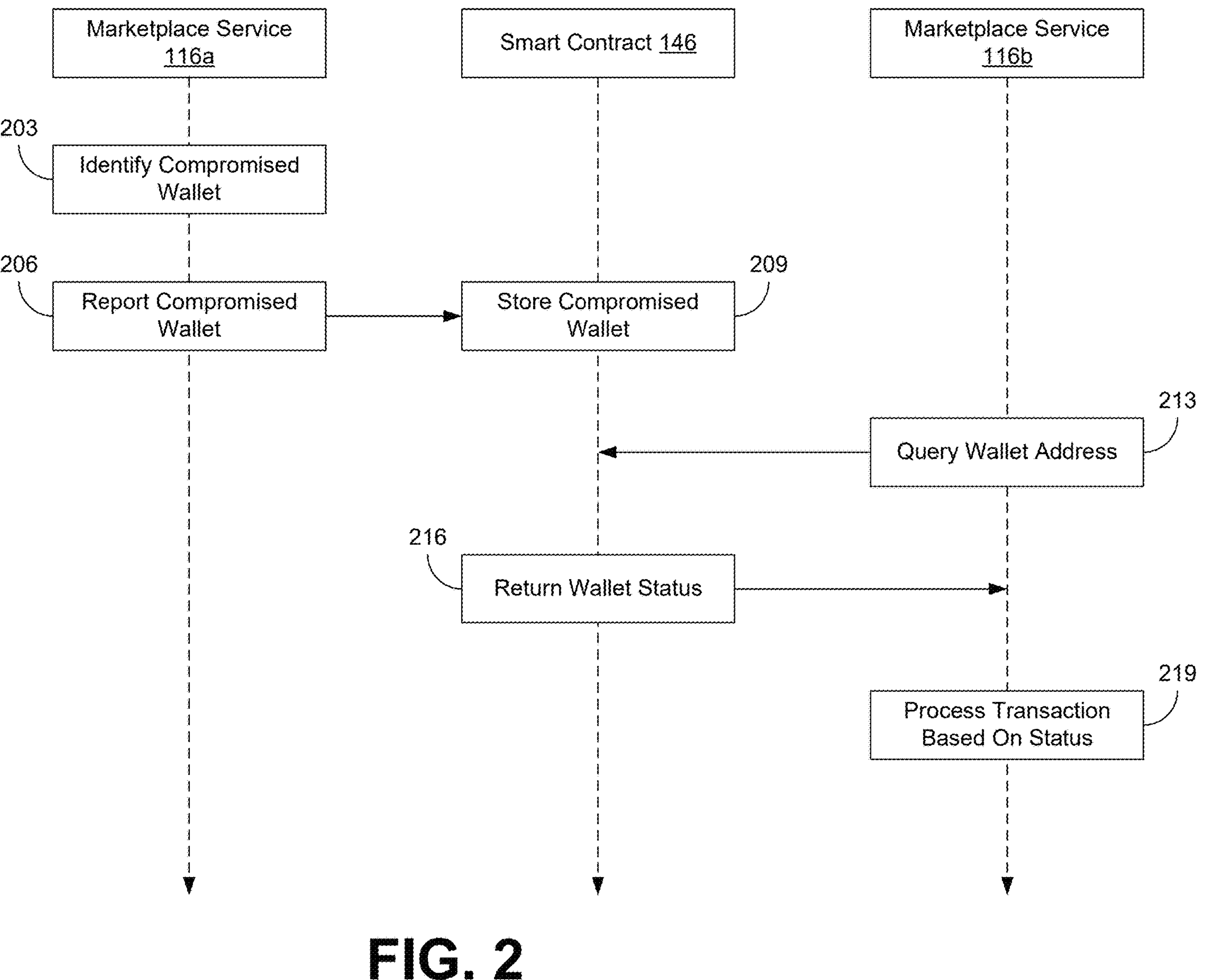
FIG. 2 is a sequence diagram illustrating the functionality implemented in the network environment of FIG. 1 according to various embodiments of the present disclosure.

Referring next to FIG. 2, shown is a sequence diagram that provides one example of the interactions between components of the network environment 100. The sequence diagram of FIG. 2 provides merely an example of the many different types of functional arrangements that can be employed in the network environment 100. As an alternative, the sequence diagram of FIG. 2 can be viewed as depicting an example of elements of a method implemented within the network environment 100.

Beginning with block 203, a first marketplace service **116*a* can identify a compromised wallet 153. This could occur in a variety of manners. For example, the marketplace service 116*a* could receive a report from an external incident reporter or other third party that cryptocurrency coins or tokens had been stolen from a first wallet and transferred to one or more recipient wallets. The first wallet and/or the recipient wallets could therefore be identified as compromised. As another example, a fraud prevention or detection service operated by the marketplace service 116*a*** could determine that transactions involving a specific wallet are indicative of fraudulent activity. Other approaches could also be used in the various embodiments of the present disclosure.

Moving to block 206, the first marketplace service **116*a* can report the compromised wallet 153 to the smart contract 146, which can act as a request to add the compromised wallet 153 to a table or list of compromised wallets 153** maintained by the smart contract 146. For example, the marketplace service 116*a* could invoke a function provided by the smart contract 146 for reporting compromised wallets 153. Arguments for said function could include the compromised wallet address 156 of the compromised wallet 153, and potentially other information (e.g., an amount of cryptocurrency coins or tokens involved in fraudulent transactions associated with the compromised wallet 153).

Then, at block 209, the smart contract 146 can store information about the compromised wallet 153. For example, the smart contract 146 could add a new compromised wallet 153 to the list, table, etc. of compromised wallets 153 maintained by the smart contract 146. This could include the compromised wallet address 156 provided by the marketplace service 116*a* at block 206. In some implementations, the smart contract 146 could verify whether the report of the compromised wallet 153 was received from an authorized wallet address. For example, the smart contract 146 could include a list of wallet addresses associated with or otherwise identifying entities authorized to identify compromised wallets 153 to the smart contract 146. In these implementations, the smart contract 146 could elect to store the compromise wallet 143 only if the report of the compromised wallet 153 were provided by or received from one of the authorized wallet addresses. In some instances, the authorized wallet address could be associated with multiple signature smart contract that is used to invoke the smart contract 146. For example, the marketplace service 116 could use a smart contract that requires multiple signatures to execute a transaction, such as a function that reports a compromised wallet 143 to the smart contract 146. At block 209, the smart contract 146 can also calculate an initial weight 159 for the newly saved compromised wallet address 156. The initial weight 159 could represent a degree to which the compromised wallet 153 is engaged in fraudulent, illicit, or illegal activity. The initial weight 159 could then be saved to the record of the compromised wallet 153. The initial weight 159 could be calculated or sourced through a variety of approaches.

For example, the initial weight 159 could be calculated based at least in part on the ratio of preexisting cryptocurrency coins or tokens associated with the compromised wallet address 156 of the compromised wallet 153 to the amount of cryptocurrency coins or tokens reported at block 206. If there were no cryptocurrency coins or tokens previously associated with the compromised wallet address 156, then the smart contract 146 could determine that all of the cryptocurrency coins or tokens now associated with the compromised wallet address 156 are the result of a fraudulent, illegal, or illicit transfer of cryptocurrency coins or tokens. In this situation, the initial weight 159 associated with the compromised wallet address 156 could be set to a value of "1" on a scale of "0" to "1," with "0" indicating that there no cryptocurrency coins or tokens associated with the compromised wallet address 156 that had an illegal, illicit, or fraudulent origin, and "1" indicating that all of the cryptocurrency coins or tokens associated with the compromised wallet address 156 had an illegal, illicit, or fraudulent origin. As another example, if the amount of illicitly, illegally, or fraudulently transferred cryptocurrency coins or tokens were equal to the amount of cryptocurrency coins or tokens already associated with the compromised wallet address 156, then the smart contract could set the initial weight 159 to a value of "0.5" to indicate half of the cryptocurrency coins or tokens associated with the compromised wallet address 156 had an illegal, illicit, or fraudulent origin.

Cryptocurrency coins or tokens could have an illegal, illicit, or fraudulent origin in a number of situations. For example, the coins or tokens could have been received from a wallet that had reported a theft, or had reported one or more specific transactions as a theft. Similarly, the coins or tokens could have been reported, recorded, or identified as payments for illegal services or activities. As another example, the coins or tokens could have been received from a wallet or wallets that are associated with sanctioned entities (e.g., individuals, countries, etc.). Cryptocurrency coins or tokens could be considered to have an illegal, illicit, or fraudulent origin for other reasons as well, according to various embodiments of the present disclosure.

As another example, the initial weight 159 could be provided or reported by a third-party. For example, the initial weight 159 could be provided or reported by first marketplace service 116*a*. This could occur, for instance, at block 206 when the first marketplace service 116*a* reports the compromised wallet 153 to the smart contract 146. As another example, the initial weight 159 could be reported by an off-chain fraud arbiter, which could execute a blockchain explorer to analyze transaction histories of individual wallets in order to determine their involvement with fraudulent activities and calculate a fraud score based at least in part on the transaction histories. The fraud score could then be reported by the fraud arbiter to the smart contract 146 for use as the initial weight 159 for the compromised wallet 153.

In some instances, the source of the third-party data could be another blockchain 109. For example, some blockchains 109 (e.g., ETHEREUM) have a number of related blockchain projects, often referred to as side-chains or level-2 (L2) blockchains, which allow for transactions to be processed off the blockchain 109, with the results committed to the blockchain 109 at a later time. Some of these side-chains or level-2 blockchains may even use the same addresses as the underlying blockchain 109. For example, the POLYGON blockchain network is a level-2 blockchain for the ETHEREUM blockchain network, and the POLYGON blockchain network shares addresses with the ETHEREUM blockchain network. Accordingly, a weight 159 associated with a wallet of the ETHEREUM blockchain network could be used as the initial weight 159 for a wallet of the POLYGON blockchain network, or vice versa.

Moreover, in some instances, the initial weight 159 could be based at least in part on a combination of a weight 159 reported by a third-party and a weight 159 calculated by the smart contract 146. For example, the initial weight 159 could be computed as a blended, average, or median value of the weight 159 reported by the third-party and the weight 159 calculated by the smart contract 146.

Next, at block 213, the second marketplace service 116*b* can send a query to the smart contract 146 regarding the status of a wallet address. For instance, the second marketplace service 116*b* could invoke a function provided by the smart contract 146 to determine whether a wallet address belongs to a compromised wallet. Accordingly, the arguments for the function could include the wallet address in question.

This could occur, for example, as a check performed by the second marketplace service 116*b* prior to sending cryptocurrency coins or tokens to a destination wallet to make sure that a transfer on behalf of a user account 123 is legitimate. As another example, this could occur as a check performed by the second marketplace service 116*b* when funds are received by a deposit wallet address 129 in order to determine whether the cryptocurrency coins or tokens received by the deposit wallet address 129 are from a reputable or legitimate source.

Subsequently, at block 216, the smart contract 146 can evaluate the compromised wallet addresses 156 to determine the status of the wallet address included as an argument in the function invoked at block 213. If the wallet address provided by the marketplace service 116*b* matches a compromised wallet address 156 of a compromised wallet 153, then the smart contract 146 could return a Boolean value indicating that the wallet address belongs to a compromised wallet 153. In some implementations, the smart contract 146 could further include the weight 159 assigned to the compromised wallet 153. Likewise, if the wallet address provided at block 213 fails to match a compromised wallet address 156 of one of the compromised wallets 153, then the smart contract 146 could return a Boolean value indicating that the wallet address does not belong to a compromised wallet 153.

Then, at block 219, the second marketplace service 116*b* can use the result returned by the smart contract 146 to determine how to process the transaction. For example, if the smart contract 146 indicated that the destination wallet address is a compromised wallet address 156, then the marketplace service 116*b* could proceed to block or refuse to transfer the cryptocurrency coins or tokens. As another example, if the smart contract indicated that a deposit wallet address 129 received cryptocurrency coins or tokens from a source wallet address that matched a compromised wallet address 156, then the marketplace service 116*b* could reverse the transaction, freeze the cryptocurrency coins or tokens pending further investigation, or perform some other action.

In either of these examples, the weight 159 assigned to the compromised wallet 153 could be used as a factor by the marketplace service 116*b* in determining whether to proceed with the transaction. For example, if the weight 159 is below a predefined threshold, the marketplace service 116*b* could decide to proceed with the transaction. This could be done, for example, to allow transactions to occur with wallets that are associated with reputable individuals or are generally associated with legitimate transactions, even if the wallet may have innocently or inadvertently received cryptocurrency coins or tokens there were of illicit, illegal, fraudulent, or otherwise questionable provenance at some point in the past.

Although the sequence diagram of FIG. 2 depicts the interactions of two marketplace services 116 with the smart contract 146, the same sequence of interactions could be performed by other applications or entities. For example, a first marketplace service 116*a* could identify and report a compromised wallet 153, while a wallet client 133 of an individual user could query the smart contract for the status of a wallet address prior to sending cryptocurrency coins or tokens to the recipient. As another example, a first wallet client 133 could identify and report the compromised wallet 153 to the smart contract 146, while a second wallet client 133 could use the smart contract 146 to query a wallet address.

Figure 3:
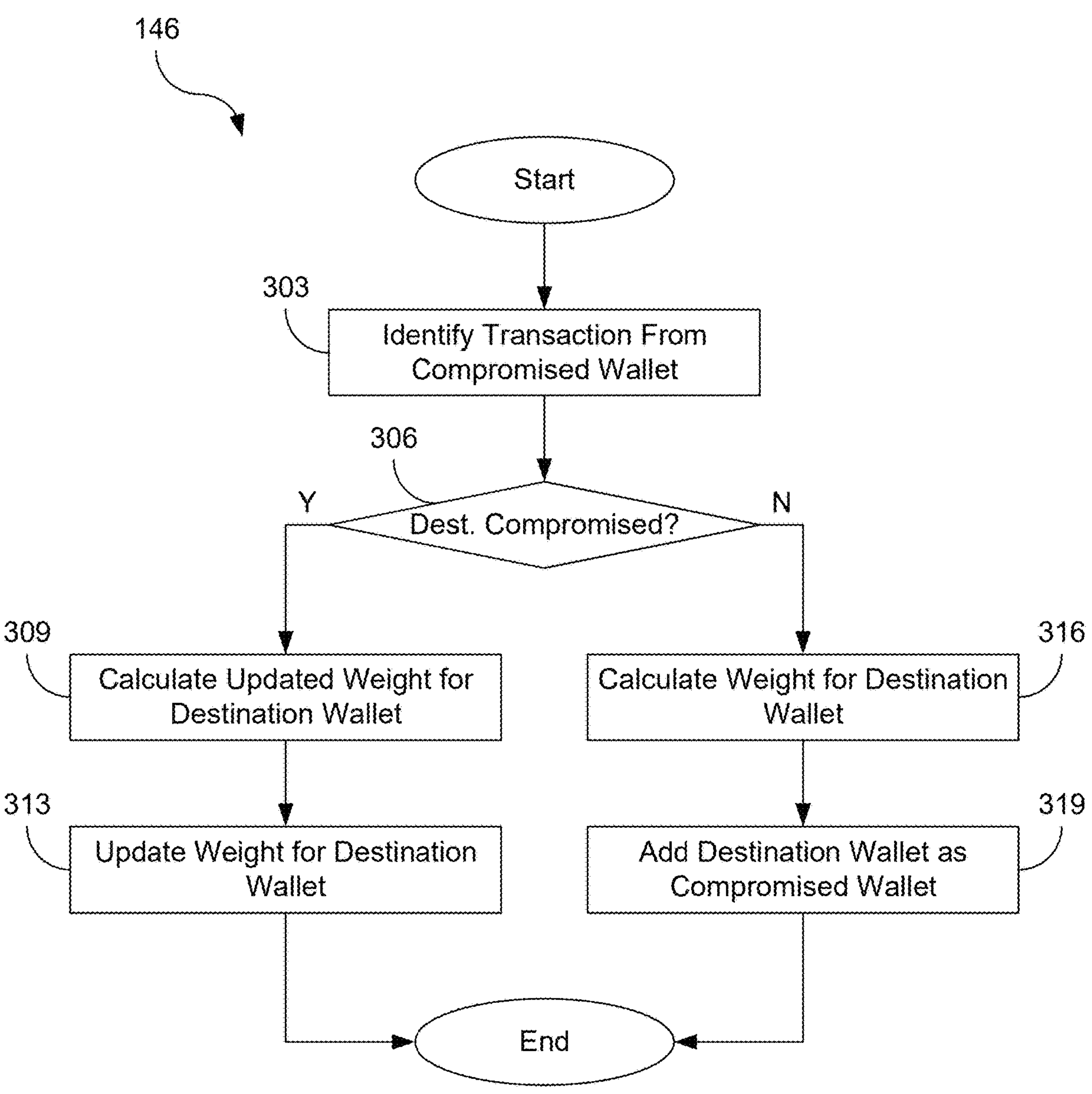
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the smart contract 146. The flowchart of FIG. 3 provides merely an example of the many different types of functional arrangements that can be employed to implement the operation of the depicted portion of the smart contract 146. As an alternative, the flowchart of FIG. 3 can be viewed as depicting an example of elements of a method implemented within the network environment 100.

Beginning with block 303, the smart contract 146 can identify that a cryptocurrency transaction on the blockchain 109 involves a compromised wallet 153. This could be done in a number of ways. For example, every time a transaction is submitted to the blockchain 109 for processing, the smart contract 146 could be called by the sender or initiator of the transaction. Similarly, a blockchain explorer or other off-blockchain oracle could analyze transactions written to the blockchain 109 involving a compromised wallet 153 and report new transactions to the smart contract 146. As another example, every time a block is written to the blockchain 109, the smart contract 146 could be executed to examine the transactions in the block to determine whether a transaction involving a compromised wallet 153 has occurred.

Next, at block 306, the smart contract 146 can determine whether the destination wallet is a compromised wallet 153. This could be determined, for example, by comparing the wallet address of the destination wallet in the cryptocurrency transaction to the compromised wallet addresses 156 known to the smart contract 146. If the destination wallet address matches a compromised wallet address 156, then the smart contract 146 can determine that the destination wallet is a known compromised wallet 153. In this situation, the process can proceed to block 309. However, if the destination wallet address fails to match a compromised wallet address 156, then the smart contract 146 can determine that the destination wallet is not a known compromised wallet 153. In this situation, the process can proceed to block 316.

If the process proceeds to block 309, the smart contract 146 can calculate an updated weight 159 for the destination wallet in the transaction to reflect that the destination wallet has received a cryptocurrency coins or tokens from compromised wallet 153 and that the received cryptocurrency tokens or coins are of questionable provenance. For example, the smart contract 146 could first multiply the weight 159 of the compromised wallet 153 that is the source of the transaction by the number of cryptocurrency coins or tokens transferred to calculate the percentage of cryptocurrency coins or tokens in the transfer that are of questionable provenance. As an illustration, if the source wallet has a weight 159 of "0.25" and the transaction involved 100 bitcoins, then the smart contract could estimate that 25 of the transferred bitcoins are likely to have an illegal, illicit, fraudulent, or otherwise illegitimate or questionable source. Second, the smart contract 146 could multiply the weight 159 of the destination wallet by the number of cryptocurrency coins or tokens associated with the destination wallet prior to the transaction to determine the amount of legitimately sourced cryptocurrency coins or tokens and the amount of illegitimately sourced cryptocurrency coins or tokens that were previously associated with the destination wallet. As an illustration, if the destination wallet had a weight 159 of "0.5" and was associated with 50 bitcoins prior to the transaction, then the smart contract 146 could determine that the destination wallet was associated with 25 legitimately sourced bitcoins and 25 illegitimately sourced bitcoins. Finally, the smart contract could sum the legitimately sourced and illegitimately sourced cryptocurrency coins or tokens to calculate a new weight 159 for the destination wallet. Using the previous examples, the smart contract 146 could determine that 75 legitimately sourced bitcoins and 25 illegitimately sourced bitcoins were transferred to the destination wallet, which had already controlled 25 legitimately sourced and 25 illegitimately sourced bitcoins. As a result, the destination wallet would now control one-hundred legitimately sourced bitcoins and 50 illegitimately sourced bitcoins after the transaction. The smart contract 146 could then determine that the new weight 159 for the destination wallet should be 0.33 to reflect that one-third of the bitcoins owned by the destination wallet are from illegitimate sources.

However, in some implementations, an updated weight 159 could be reported or provided to the smart contract 146 by a third-party service. For example, a marketplace service 116 could calculate an updated weight 159 based on activity it has observed on the blockchain 109, and provide the updated weight 159 to the smart contract 146 at block 309. Similarly, an off-blockchain fraud arbiter could execute a blockchain explorer to analyze transaction histories of individual wallets in order to determine their involvement with fraudulent activities and calculate an updated fraud score based at least in part on the transaction histories. The updated fraud score could then be reported by the fraud arbiter to the smart contract 146 for use as the updated weight 159 for the compromised wallet 153.

In some instances, the source of the third-party data could be another blockchain 109. For example, the POLYGON blockchain network is a level-2 blockchain for the ETHEREUM blockchain network, and the POLYGON blockchain network shares addresses with the ETHEREUM blockchain network. Accordingly, an update to the weight 159 associated with a wallet of the ETHEREUM blockchain network could be used as the basis for updating the weight 159 for a wallet of the POLYGON blockchain network, or vice versa.

Moreover, in some instances, the updated weight 159 could be based at least in part on a combination of an updated weight 159 reported by a third-party and an updated weight 159 calculated by the smart contract 146. For example, the updated weight 159 could be computed as a blended, average, or median value of the updated weight 159 reported by the third-party and the updated weight 159 calculated by the smart contract 146.

Then, at block 313, the smart contract 146 can update the compromised wallet 153 with the compromised wallet address 156 that matches the destination wallet address to reflect the new weight 159 previously calculated at block 309. Once the compromised wallet 153 is updated, the process can end.

However, if the process proceeds to block 316, the smart contract 146 can calculate an initial weight 159 for the destination wallet using the process previously described in the discussion of FIG. 1 and/or block 309.

Next, at block 319, the smart contract 146 can create and save a new compromised wallet 153 record for the destination wallet involved in the transaction. This can include saving the destination wallet address as the compromised wallet address 156 for the new compromised wallet 153, as well as saving the weight 159 that was calculated at block 316 to the new record for the compromised wallet 153. Once the new compromised wallet 153 is saved by the smart contract 146, the process can end.

Figure 4:
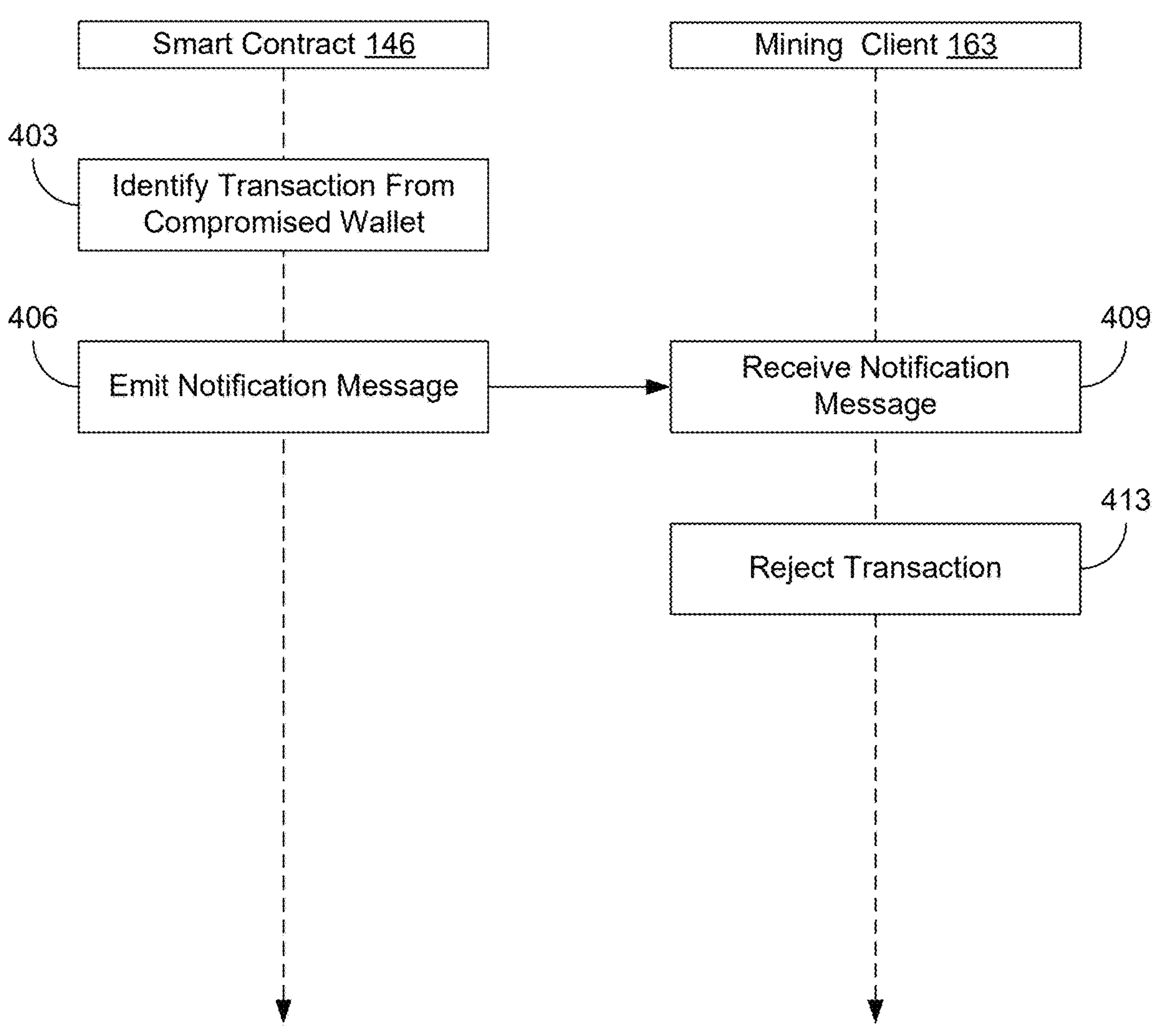
FIG. 4 is a sequence diagram illustrating the functionality implemented in the network environment of FIG. 1 according to various embodiments of the present disclosure.

Referring next to FIG. 4, shown is a sequence diagram that provides one example of the interactions between components of the network environment 100. The sequence diagram of FIG. 4 provides merely an example of the many different types of functional arrangements that can be employed in the network environment 100. As an alternative, the sequence diagram of FIG. 4 can be viewed as depicting an example of elements of a method implemented within the network environment 100.

Beginning with block 403, the smart contract 146 can identify that a cryptocurrency transaction on the blockchain 109 involves a compromised wallet 153. This could be done in a number of ways. For example, every time a transaction is submitted to the blockchain 109 for processing, the smart contract 146 could be called by the sender or initiator of the transaction. As another example, every time a block is written to the blockchain 109, the smart contract 146 could be executed to examine the transactions in the block to determine whether a transaction involving a compromised wallet 153 has occurred.

Then, at block 406, the smart contract 146 can emit a notification to the nodes of the blockchain 109. The notification can include an identifier of the transaction that was identified as originating from a compromised wallet 153 at block 403. In those implementations where transactions can be prioritized when a higher fee is paid, the smart contract 146 could include a fee that is sufficient to ensure that the notification message is processed prior ahead of other messages or transactions. In other implementations, the notification message may be flagged with an identifier to allow mining clients 163 to differentiate the notification message from other messages or transactions waiting to be recorded to the blockchain 109.

Next, at block 409, individual mining clients 163 can receive the notification message. In some implementations, the individual mining clients 163 may search the pool of transactions pending processing for messages that are flagged as notification messages from the smart contract 146 in order to process the notification message prior to or ahead of other transactions. In other implementations, the individual mining clients 163 may process the message prior to or ahead of other transactions because of the fee paid to miners by the smart contract 146 for processing the message.

Subsequently, at block 413, the individual mining clients 163 can extract the transaction identifier from the notification message and attempt to reject the transaction specified in the notification message. For example, the individual mining clients 163 could scan the pool of pending transactions for a transaction that matches the transaction specified in the notification message. If a matching transaction is found, the mining client 163 can then record the transaction as rejected in a subsequent block. However, if the matching transaction is not found in the pool of pending transactions, then this would indicate that the transaction has already been processed and recorded to the blockchain 109, in which case no further action would be taken by the mining client 163.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

For additional information and context, see U.S. patent application Ser. No. 17/737,617, filed on May 5, 2022, which is hereby incorporated by reference in its entirety and for all purposes.

Therefore, the following is claimed:

1. A system for improving digital wallet security comprising:

one or more processors; and one or more non-transitory computer-readable medium storing instructions executable by the one or more processors, wherein the instructions, when executed, cause the system to perform operations comprising:

receiving, from a first wallet address, a request to add a second wallet address to a list of compromised wallet addresses associated with a decentralized digital asset network;

generating, by the system operably connected as a node of the decentralized digital asset network, a smart contract comprising a computer program configured to execute automatically across a plurality of other nodes of the decentralized digital asset network, the smart contract configured to:

verify that the first wallet address is an authorized wallet address associated with the decentralized digital asset network; and verify that the request is signed by the authorized wallet address;

in response to verifying that the request is signed by the authorized wallet address, causing each node of the plurality of other nodes of the decentralized digital asset network to automatically update to-add the second wallet address to the list of compromised wallet addresses;

tracking and identifying a transaction associated with a transfer of cryptocurrency coins or tokens from the second wallet address to a destination wallet address;

determining that the destination wallet address is not included in the list of compromised wallet addresses;

adding, based at least in part on the destination wallet address being identified by the transaction, the destination wallet address to the list of compromised wallet addresses;

updating, based at least in part on the destination wallet address being identified by the transaction, a weight associated with the destination wallet address, the weight representing a degree of compromise associated with the destination wallet address; and emitting a message to the plurality of other nodes, the message indicating that the transfer should be rejected.

2. The system of claim 1, further comprising:

receiving a status request, the status request comprising the second wallet address; and in response to receiving the status request, returning a Boolean value indicating that the second wallet address is included in the list of compromised wallet addresses.

3. The system of claim 1, wherein the weight is based at least in part on a ratio of the cryptocurrency coins or tokens transferred from the second wallet address to cryptocurrency coins or tokens associated with the destination wallet address that originated from an uncompromised wallet address.

4. The system of claim 1, the operations further comprising:

identifying a transaction reflecting a transfer of cryptocurrency coins or tokens from a compromised wallet address in the list of compromised wallet addresses to a destination wallet address;

determining that the destination wallet address is not included in the list of compromised wallet addresses; and adding the destination wallet address to the list of compromised wallet addresses.

5. The system of claim 1, wherein each wallet address in the list of compromised wallet addresses is associated with a weighted value representing a degree of compromise of each wallet address.

6. The system of claim 1, the operations further comprising reviewing a block recorded to the decentralized digital asset network, the block configured to identify the transaction.

7. A method comprising:

receiving, from a first wallet address, a request to add a second wallet address to a table or list of compromised wallet addresses of a digital asset network;

generating, by a node of the digital asset network, a smart contract configured to execute automatically across a plurality of other nodes of the digital asset network, the smart contract configured to:

verify that the first wallet address is an authorized wallet address associated with the digital asset network; and verify that the request is signed by the authorized wallet address;

in response to verifying that the request is signed by the authorized wallet address, causing each node of the plurality of other nodes of the digital asset network to automatically update to add the second wallet address to the table or list of compromised wallet addresses;

tracking and identifying a transaction associated with a transfer of cryptocurrency from the second wallet address to a destination wallet address;

determining that the destination wallet address is not included in the table or list of compromised wallet addresses;

adding, based at least in part on the destination wallet address being identified by the transaction, the destination wallet address to the table or list of compromised wallet addresses;

updating, based at least in part on the destination wallet address being identified by the transaction, a weight associated with the destination wallet address; and emitting a message to the plurality of other nodes, the message indicating that the transfer should be rejected.

8. The method of claim 7, further comprising:

receiving a status request, the status request comprising the second wallet address; and in response to receiving the status request, returning a Boolean value indicating that the second wallet address is included in the table or list of compromised wallet addresses.

9. The method of claim 7, wherein the weight is based at least in part on a ratio of the cryptocurrency transferred from the second wallet address to cryptocurrency associated with the destination wallet address that originated from an uncompromised wallet address.

10. The method of claim 7, wherein identifying the transfer of cryptocurrency from the second wallet address comprises reviewing a block recorded to the digital asset network, the block configured to identify the transaction.

11. One or more non-transitory computer-readable medium storing instructions executable by one or more processors, wherein the instructions, when executed, cause the one or more processors to perform operations comprising:

receiving, from a first wallet address, a request to add a second wallet address to a table or list of compromised wallet addresses of a digital asset network;

generating, by a node of the digital asset network, a smart contract comprising a computer program configured to execute automatically across a plurality of other nodes of the digital asset network, the smart contract configured to:

verify that the first wallet address is an authorized wallet address associated with the digital asset network; and verify that the request is signed by the authorized wallet address;

in response to verifying that the request is signed by the authorized wallet address, causing each node of the plurality of other nodes of the digital asset network to automatically update to add the second wallet address to the table or list of compromised wallet addresses;

tracking and identifying a transaction associated with a transfer of cryptocurrency from the second wallet address to a destination wallet address;

determining that the destination wallet address is not included in the table or list of compromised wallet addresses;

adding, based at least in part on the destination wallet address being identified by the transaction, the destination wallet address to the table or list of compromised wallet addresses;

updating, based at least in part on the destination wallet address being identified by the transaction, a weight associated with the destination wallet address; and emitting a message to the plurality of other nodes, the message indicating that the transfer should be rejected.

12. The one or more non-transitory computer-readable medium of claim 11, the operations further comprising:

receiving a status request, the status request comprising the second wallet address; and in response to receiving the status request, returning a Boolean value indicating that the second wallet address is included in the table or list of compromised wallet addresses.

13. The one or more non-transitory computer-readable medium of claim 11, wherein the weight is based at least in part on a ratio of the cryptocurrency transferred from the second wallet address to cryptocurrency associated with the destination wallet address that originated from an uncompromised wallet address.

14. The system of claim 1, wherein the weight associated with the destination wallet address on the decentralized digital asset network is used as a weight for the destination wallet address on a second digital asset network.

15. The system of claim 1, the operations further comprising:

causing, in response to the message, a mining node of the decentralized digital asset network to scan a pool of pending transactions for the transaction; and recording the transaction as rejected in a subsequent block.

16. The method of claim 7, the transaction being a first transaction, the method further comprising:

determining, based at least in part on the weight being below a threshold, that a second transaction associated with the destination wallet address is permitted to proceed.

17. The method of claim 7, wherein the weight represents a degree of compromise associated with the destination wallet address, the weight based at least in part on a fraud score calculated using a transaction history of the destination wallet address.

18. The method of claim 7, further comprising:

causing, in response to the message, a mining node of the digital asset network to scan a pool of pending transactions for the transaction; and recording the transaction as rejected in a subsequent block.

19. The one or more non-transitory computer-readable medium of claim 11, wherein the weight is based at least in part on a combination of a first weight reported by a third-party and a second weight calculated by the smart contract.

20. The one or more non-transitory computer-readable medium of claim 11, wherein tracking and identifying the transaction comprises reviewing a block recorded to the digital asset network to identify the transaction.

21. The one or more non-transitory computer-readable medium of claim 11, wherein the weight associated with the destination wallet address on the digital asset network is used as a weight for the destination wallet address on a second digital asset network.

* * * * *